United States Patent [19]

Scharrenbroich

[11] Patent Number: 5,388,981
[45] Date of Patent: Feb. 14, 1995

[54] CLOSURE ARRANGEMENT FOR MOLDS FOR MANUFACTURE OF OBJECTS FROM THERMOPLASTIC PLASTICS MATERIAL

[75] Inventor: Helmut Scharrenbroich, Neunkirchen-Seelscheid, Germany

[73] Assignee: Battenfeld Fischer Blasformtechnik GmbH, Troisdorf/Spich, Germany

[21] Appl. No.: 70,579

[22] Filed: Jun. 2, 1993

[30] Foreign Application Priority Data

Jun. 3, 1992 [DE] Germany ............... 4218260

[51] Int. Cl.⁶ ............................................. B29C 49/56
[52] U.S. Cl. ................................... 425/541; 425/450.1; 425/589
[58] Field of Search ............ 425/541, 589, 592, 450.1, 425/451.5, 451.9

[56] References Cited

U.S. PATENT DOCUMENTS

| | | | |
|---|---|---|---|
| 4,421,472 | 12/1983 | Martin, Jr. | 425/541 |
| 4,560,341 | 12/1985 | Hafele | 425/541 |
| 4,606,717 | 8/1986 | Polak et al. | 425/541 |
| 4,801,260 | 1/1989 | Oles et al. | 425/541 |
| 4,878,828 | 11/1989 | Wollschläger et al. | 425/589 |
| 4,998,873 | 3/1991 | Martin et al. | 425/589 |

FOREIGN PATENT DOCUMENTS 0300223 6/1988 European Pat. Off. .

*Primary Examiner*—James P. Mackey
*Attorney, Agent, or Firm*—Anderson Kill Olick & Oshinsky

[57] ABSTRACT

A closure device for closing a mold tool for manufacturing objects from thermoplastic materials includes a frame including a first yoke, which supports directly one of the two displaceable mold plates supporting the halves of the mold tool, a second yoke remote from the first yoke and spaced tie and pressure rods extending between the first and second yokes. The ends of the tie and pressure rods, proximate to the first yoke, are rigidly connected with the first yoke and the opposite ends of the tie and pressure rods are hingedly connected to the second yoke. The closure device further includes a mechanical drive extending between the second yoke and the other of the two mold plates and a synchronization device for enabling synchronous displacement of the two mold plates.

3 Claims, 3 Drawing Sheets

CLOSURE ARRANGEMENT FOR MOLDS FOR MANUFACTURE OF OBJECTS FROM THERMOPLASTIC PLASTICS MATERIAL

FIELD OF THE INVENTION

The present invention is directed to a closure device for molds for manufacture of objects from thermoplastic plastics material, especially for blow-molding of hollow members in blow-molding machines.

BACKGROUND OF THE INVENTION

EP-A2-0 300 223 discloses a closure device having a frame with a power drive suspended at a stationary housing. The housing carries separate guide beams, independent of the frame, with the yokes of the frame engaging through support links at least at the die plates and/or at the interposed power drive. The axial planes of the support links are located on the line of action of the closing force between the two die plates.

The guide for the die plates and the means for applying the closing force are thereby decoupled from each other in an appropriate and space-saving manner so that the frame causing the transmittal of the closing force can therefore freely be deformed, without affecting the guidance of the die plates. The exact opposite displacement motion of the die plates is therefore also maintained if the frame deforms under the action of the closing force, since synchronization device is coupled to this frame at a location, which is not subjected to any deformation forces.

It is an object of the present invention to provide a clamping arrangement which permits deformation of the frame under the action of the closing force. It is also an object of the invention to provide a clamping arrangement which compensates for the resulting disadvantageous effects in the region of the molding tool and the guides.

SUMMARY OF THE INVENTION

These and other objects of the invention, which shall become hereafter apparent, are achieved by a closing arrangement for the manufacture of objects from thermoplastic materials, especially for blow-molding of hollow members in blow-molding machines. The arrangement includes two mold plates which are linearly displaceable on guide beams and moveable against each other by a power drive such as a closure motor, a synchronization device and a frame having at least one tie or tension rod, one compression or pressure rod, as well as two yokes connecting the rods at their ends. The tie and pressure rods extend parallel to the displacement direction of the mold plates, while the yokes extend transversely to the die plates' displacement direction.

One yoke engages with a cantilever arm directly at the one mold plate. Significantly, the other yoke of the frame, remote from the mold plates, is connected with the pressure rod, the tie rod and the power drive by a joint oriented perpendicularly to the frame plane, while the one yoke engaging directly at the one mold plate by its cantilevered arm, is rigidly connected to a pressure rod as well as to the tie rod of the frame.

By having the other yoke removed from the hold plates into the frame, it is free from action of force couples and can assume a random position, oblique in direction of the plane of the frame. If elongations of the tie or tension rod and shortening of the compression or pressure rod of the frame occur under the effect of the closing force, the yoke, being free of force couples, can move into an appropriate oblique position, meaning the length differences of tie rod and compression rod are compensated. Otherwise, a reaction or feedback can be exerted upon the yoke rigidly connected to the compression rod and the tie rod.

Furthermore, having the synchronization apparatus engage at the other yoke of the frame, remote from the mold plates in the joint for the compression rod, if the rod is simultaneously coupled to the joint so that power drive engages at the second mold plate, the movement of the molding tool under the influence of the closing force from its calibrated position remains so small as to be negligible.

BRIEF DESCRIPTION OF THE DRAWINGS

The invention will be better understood by reference to the Detailed Description of the Preferred embodiment in connection with the drawings, of which.

DETAILED DESCRIPTION OF THE PREFERRED EMBODIMENT

Figure 1:
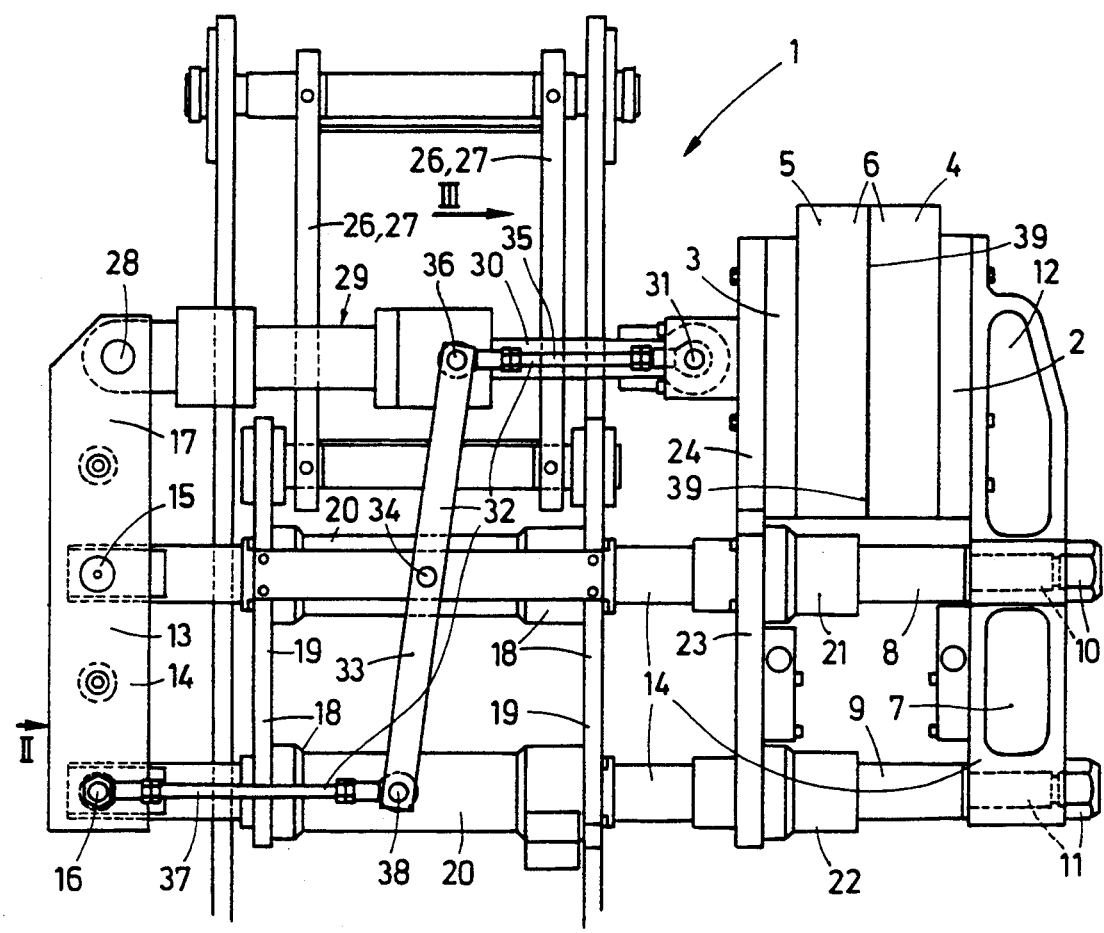
FIG. 1 is a side view and partially longitudinal view of a closing apparatus for molds for manufacture of hollow members on blow-molding machines.

Referring now to the drawings, wherein like numerals reflect like elements throughout the various views, FIG. 1 shows a closure apparatus 1 which is suited for cooperation with molds for manufacture of hollow members from thermoplastics plastics in blow-molding machines and also for cooperation with dies which are used in other ways, for instance, in injection molding for fabrication of objects from thermoplastic material. Such closure apparatus 1 can be moved back and forth, in a known manner, by a special transport system, for instance, by a parallelogram arm between two different work stations, for instance, a hose extrusion station and a blow-molding station.

The closure apparatus 1 comprises a first mold plate 2 and a second mold plate 3, wherein the one die half 4 or 5 is fastened hereon. The mold plate 2 sits on a yoke 7 that is rigidly fastened at the rear end of a tie rod 8 and pressure rod 9 anchored by one each straining or prestressed screw connection 10 and 11. The tie rod 8 and the pressure rod 9 are parallel to each other and extend at a right angle to the yoke 7, on whose cantilever arm 12 sits the mold plate 2. The tie rod 8 and the pressure rod 9 engage, at their other end, an additional yoke 13 and form, together with the yoke 7, a frame 14.

While tie rod 8 and pressure rod 9 have rigid connection with the yoke by the straining or prestressed screw connections 10 and 11, which are connected to the yoke 13 by a joint 15 or 16, oriented at a right angle to the frame plane. The yoke 13 is also equipped with a cantilever arm 17 and in such a way that both cantilever arms 12 and 17 extend, in the same direction, sideways or upwards from the frame 14. The tie road 8 and the pressure rod 9 of the frame 14 are held in a mount 18, comprising two end plates 19 and two sleeve tubes 20 connecting the end plates to be spaced from each other. The segments of tie rods 8 and pressure rods 9 projecting out of the mount 18 towards the yoke 7, form guide beams or struts for displaceable sleeve pieces 21 and 22 of a transverse cross tie 23, with a cantilever 24 where the second die plate 3 is anchored.

The end plates 19 of the mount 18 (see FIG. 3) have an essentially angularly-shaped form with a vertical leg and a horizontal leg. While both end plates 19 are in connection by the vertical leg of the angle into the two sleeve tubes 20, two support arms 25 placed in their horizontal legs, engage parallelogram 26 and 27 which, for instance, are suspended at a cantilever beam (not shown).

Figure 3:
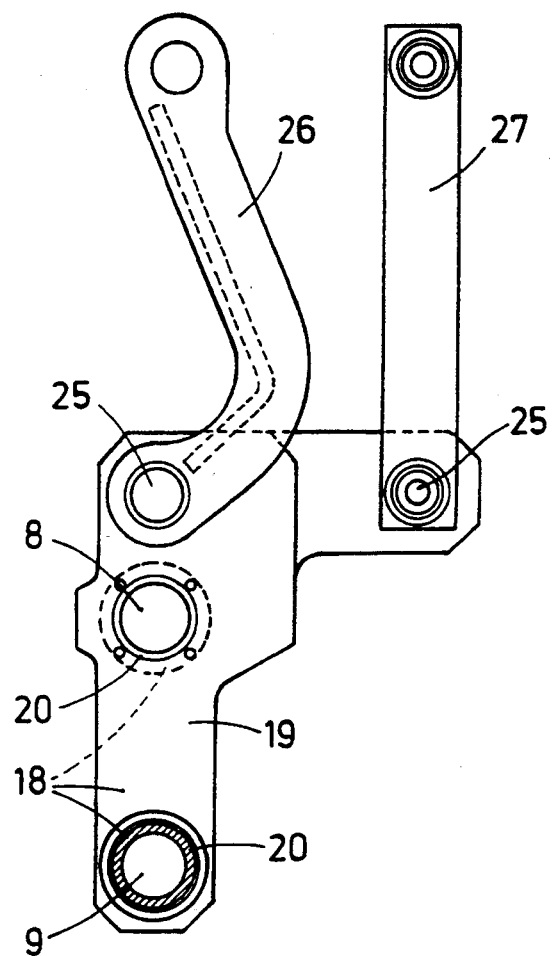
FIG. 3 is a view in direction of arrow III.

It is evident from FIG. 3 that parallelograms 26 have a curved shape, while the parallelogram arms 27 are straight. A power drive 29, for instance, a hydraulic or pneumatic piston-cylinder unit, is suspended as a closure motor at the cantilever arm 17 of the yokes 13 by a joint 28, axially parallel to the joints 15 and 16. Herein, its piston rod 30 engages at the cantilever 24 of the transverse tie rod 23, which is displaceable upon the longitudinal segments of tie rod 8 and compression rod 9 by sleeve pieces 21 and 22.

The rods 8 and 9, not only constitute portions of the frame essential for the function of the apparatus, but are used also as guide bars for the transverse cross tie 23, its cantilever 24 and the second mold plate 3 fastened thereon. The connection of the piston rod 30 of the power drive 29 to the cantilever 4 of the transverse tie rod 23 is accomplished by a joint 31, which again is oriented parallel to all other joints 15, 16 and 28 located at yoke 13 or the cantilever arm 17 of the frame 14.

A synchronizing device 32 is allocated to the mount 18, in order that the two mold plates 2 and 3 of the closure apparatus 1 and also the mold halves 4 and 5 of the molding tool 6 carried by the plates can be moved synchronously and oppositely to each other with respect to a present calibration position. This synchronization device 32 compresses an equal-arm lever 33, suspended at the mount 18 to be angularly pivotable around a joint 34. One arm of this equal-arm lever 33 is connected with the cantilever 24 of the transverse tie rod 23 by a coupling rod 35. The mold plate 3 sits on the cantilever 24. The coupling rod 35 engages at the joint 31 and is connected to the equal-arm lever 33 by an identically oriented joint 36. Another coupling rod 37 is connected through a joint 32 to the other arm of the equal-arm lever 33, which again engages in the joint 16 at the frame 14 between the pressure rod 9 and the yoke 13.

The synchronization device 32 cooperates with the closure arrangement 1 in such a way that a deformation of the frame 14 from the influence of the closure force action substantially does not lead to a displacement of the mold separation plane relative to the calibration plane 39—39. Thus, this displacement is compensated by the disposition of the synchronization device.

The design and position of the frame 14 of the closure arrangement 1 and its cooperation with the two mold plates 2 and 3 for the mold halves 4 and 5 of the molding tool 6, described above, is of such a type, that the deformation of the frame 14, caused by the action of the closure force effect, can be used not only to counteract an undesirable oblique position of the mold separation plane, but also to anticipate a disadvantageous deviation of the calibrated position from the calibration plane 39—39.

While the oblique position of the mold separation plane leads to excessive wear in the guide bushings of the molding tool 6, as well as also of the cutting edges within the molding tool 6, the offset of the calibrated position results in excessive wear of the blow nozzle and to an inexact calibration of the preform.

Figure 2:
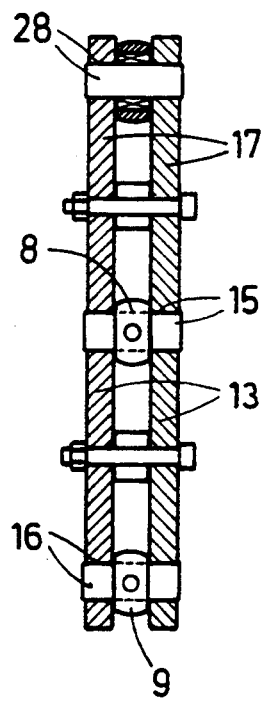
FIG. 2 is a sectional view in direction of arrow II in FIG. 1.
Figure 4:
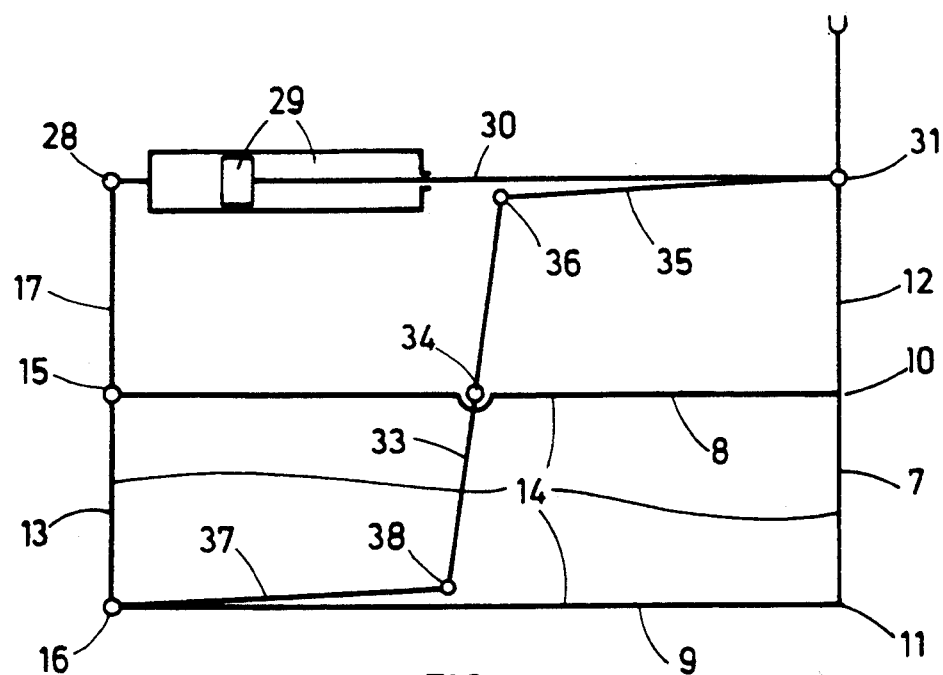
FIGS. 4 and 5 depict diagrammatically simplified illustration of the system function of the clamping apparatus depicted in FIG. 1 in a state not stressed by the effect of the closing force and in a state when stressed by the closing force.
Figure 5:
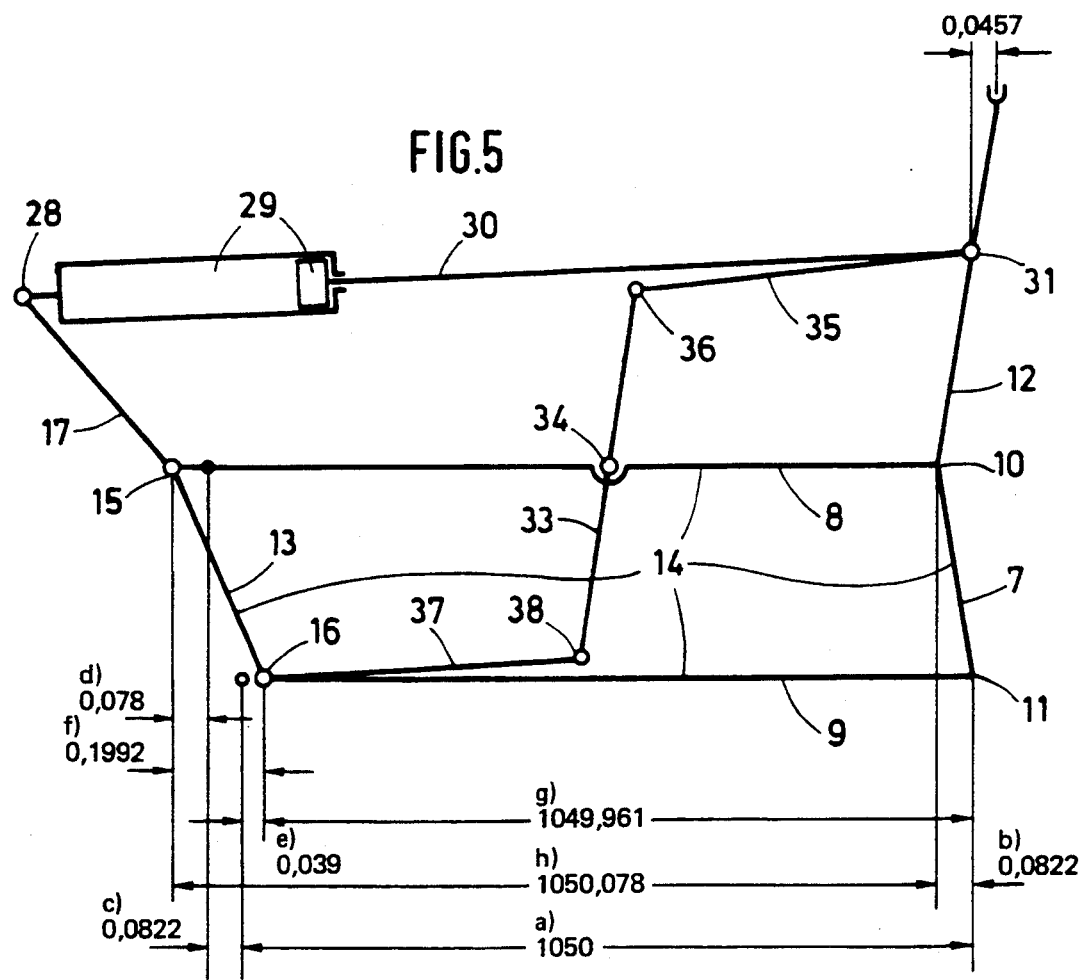

The functioning of the closure apparatus 1, described in detail above with the help of FIGS. 1 to 3, is clearly evident from the diagrammatic illustrations in FIGS. 4 and 5. FIG. 4 shows the essential system links of the frame 14 and the synchronization device 32 in the unstressed or unloaded state, i.e., not influenced by the action of the closure force effect generated by the power drive 29. On the other hand, the state of the system links of the frame 14 and synchronization device 32 when exposed to the influence of the closure force generated by the power drive 29, is evident from FIG. 5.

The dimensional data shown in FIG. 5 are intended to make clear to what extent an elastic lengthening of the tie rod 8 and elastic shortening of the compression rod 9 and a bend-through or deflection of the yokes 7 and 13 occurs under the influence of the closure force upon the frame 14 and how these deformations compensate each other relative to the calibration plane 39—39 in the direction to the mold plates 2 and 3, or towards the molding tool 6.

This effect is achieved by the connecting of the yoke 13 of the frame 14 remote from the mold plates 2 and 3 with the tie rod 8, the pressure rod 9 and the power drive 29 by a joint 16, 15, 28 oriented at a right angle to the plane of the frame, while the yoke 7 engaging directly at the one mold plate 2 has a rigid connection by a prestressed screw connection 10 or 11 with the tension tie rod 8 as well as with the pressure rod 9 of the frame 14.

The orientation of the molding tool 6, assuming the closed position upon the calibration plane 39—39, has the advantage that the synchronization device 32 engages at the joint 31 on the cantilever 24 of the transverse cross tie 23 for the die plate 3, while it is connected to the yoke 13 at the joint 16 of the pressure rod 9.

In FIG. 5, a) corresponds to the length of the overall system in the unloaded states. b) and c) are inserted for the bend-through or bending deflection of the yokes 7 and 13 in the loaded states. d) corresponds to the lengthening of the tie rod 8 in the loaded state, while e) corresponds to the shortening of the pressure rod 9 in a loaded state of the system. f) corresponds to the sum of the dimensional states c), d), and f), while the g) represents the dimension a) minus the dimension e). h) corresponds finally to the result from the dimensional statements f) and g), minus the dimension b).

Since the yoke 13 is in coupled connection through the joints 15 and 16 with the tension rod 8 and the pressure rod 9 and the cantilever arm 17 is in coupled connection through the joint with the power drive 29, the yoke 13 and the cantilever arm 17 can, in the loaded state of the overall system, assume to a considerable extent, an oblique position free of force couples this is discernible in an exaggerated way in FIG. 5. Consequently, the connection between the pressure rod 9 and the yoke 7, established by the prestressed screw connection 11, can correspondingly move to the right, according to the dimensional indication or statement b), meaning the inclined or oblique position of the yoke with the cantilever or outrigger 12, which occurs because of the length differences of tension rod 8 and pressure rod 9 due to the load is again compensated. Apart from that, the tie rod 8 is free of force couples and can therefore no longer bend through or deflect in bending.

While the preferred embodiment of the invention has been disclosed in detail, modification and adaptations may be made thereto, without departing from the spirit and scope of the invention, as delineated in the appended claims:

What is claimed is:

1. A closure device for closing a mold tool for manufacturing objects from thermoplastic material, the mold tool having two halves, said closure device comprising:
   two mold plates for supporting the two halves of the mold tool, respectively;
   a frame for supporting said two mold plates for displacement toward and away from each other, said frame comprising:
   first and second yokes spaced from each other and extending transverse to a displacement direction of said two mold plates, said first yoke directly supporting one of said two mold plates;
   tie and pressure rods extending between said first and second yokes parallel to each other, said tie and pressure rods providing for guided displacement of said two mold plates, said tie and pressure rods each having first and second ends;
   two rigid joints for rigidly connecting the first ends of said tie and pressure rods to the first yoke;
   two articulated joints extending perpendicular to a plane of said frame for hingedly connecting the second ends of said tie and pressure rods to the second yoke;
   drive means for displacing said two mold plates, said drive means extending between said second yoke and another of said two mold plates;
   articulated means extending perpendicular to the displacement direction for hingedly connecting an end of said drive means, remote from the another of the two mold plates, to said second yoke; and
   synchronization means for enabling synchronous displacement of said two mold plates.

2. The closure device of claim 1, wherein said synchronization means extends between said drive means and said pressure rod, said closure device further comprising means for connecting an end of said synchronization means, remote from said drive means, with the articulated joint which connects said pressure rod with said second yoke.

3. The closure device of claim 2, further comprising an articulated element for connecting said drive means to the another of said two mold plates and means for connecting an end of said synchronization means, proximate to said drive means, with said articulated element.

* * * * *